United States Patent
Chai et al.

(10) Patent No.: US 12,293,477 B2
(45) Date of Patent: May 6, 2025

(54) ADJUSTING AUDIBLE AREA OF AVATAR'S VOICE

(71) Applicant: INTERNATIONAL BUSINESS MACHINES CORPORATION, Armonk, NY (US)

(72) Inventors: Meng Chai, Shanghai (CN); Dan Zhang, Shanghai (CN); Yuan Jie Song, Shanghai (CN); Yu Li, Beijing (CN); Wen Ting Su, Beijing (CN); Xiao Feng Ji, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 290 days.

(21) Appl. No.: 18/187,096

(22) Filed: Mar. 21, 2023

(65) Prior Publication Data

US 2024/0320925 A1    Sep. 26, 2024

(51) Int. Cl.
*G06T 19/00* (2011.01)
*G06F 40/284* (2020.01)
(Continued)

(52) U.S. Cl.
CPC .......... *G06T 19/006* (2013.01); *G06F 40/284* (2020.01); *G06T 19/20* (2013.01);
(Continued)

(58) Field of Classification Search
None
See application file for complete search history.

(56) References Cited

U.S. PATENT DOCUMENTS 6,772,195 B1    8/2004    Hatlelid
7,616,226 B2    11/2009   Roessler
(Continued)

FOREIGN PATENT DOCUMENTS

CN    101690150 A    3/2010
CN    101978707 A    2/2011

OTHER PUBLICATIONS

Dai, et al., "Transformer-XL: Attentive Language Models Beyond a Fixed-Length Context," arXiv [online], Jun. 2, 2019, 20 pages, arXiv:1901.02860v3, Retrieved from the Internet: <URL: https://arxiv.org/abs/1901.02860>.
(Continued)

*Primary Examiner* — Harry S Hong
(74) *Attorney, Agent, or Firm* — Robert D. Bean

(57) ABSTRACT

According to one embodiment, a method, computer system, and computer program product for adjusting an audible area of an avatar's voice is provided. The present invention may include receiving, at a microphone, a source audio; creating a received audio; calculating, by a generative model, a voice propagation distance of a user based on the source audio, the received audio, and a templated text sentence describing a category of a mixed reality environment experienced by the user; drawing a virtual circle within the mixed reality environment centered on a user avatar representing the user and with a radius equal to the voice propagation distance; and transmitting the source audio to one or more participants within the mixed-reality environment represented by one or more participant avatars located within the virtual circle.

20 Claims, 6 Drawing Sheets

(51) Int. Cl.
*G06T 19/20* (2011.01)
*G10L 21/034* (2013.01)
*G10L 21/10* (2013.01)
*G10L 25/51* (2013.01)

(52) U.S. Cl.
CPC ............ *G10L 21/034* (2013.01); *G10L 21/10* (2013.01); *G06T 2200/24* (2013.01); *G06T 2219/024* (2013.01); *G06T 2219/2016* (2013.01)

(56) References Cited

U.S. PATENT DOCUMENTS

| | | |
|---|---|---|
| 7,840,668 B1 | 11/2010 | Sylvain |
| 9,826,331 B2 | 11/2017 | Wu |
| 10,952,006 B1 | 3/2021 | Krol |
| 11,070,768 B1 | 7/2021 | Krol |
| 2008/0252637 A1* | 10/2008 | Berndt ................ G06T 19/00 345/419 |
| 2008/0273714 A1* | 11/2008 | Hartung ............... H04R 1/323 381/86 |
| 2009/0089685 A1 | 4/2009 | Mordecai |
| 2009/0303984 A1 | 12/2009 | Clark |
| 2010/0164946 A1* | 7/2010 | Hyndman ............ A63F 13/10 345/173 |
| 2017/0351476 A1 | 12/2017 | Yoakum |
| 2020/0084564 A1 | 3/2020 | Mindlin |
| 2021/0339143 A1 | 11/2021 | Bar-Zeev |
| 2021/0406094 A1* | 12/2021 | Hill .................... G06F 3/167 |

OTHER PUBLICATIONS

Park, et al., "A Realistic Chat Environment for Virtual Avatars in Cyber Space," International Conference on Cyberworlds 2008 [conference paper], Sep. 2008, 7 pages, ResearchGate, Hangzhou, CN, Retrieved from the Internet: <URL: https://www.researchgate.net/publication/220916746>.

Unknown Author, "3D space sound effect + air attenuation + human voice blur," chowdera.com [online], Feb. 28, 2022 [accessed on Nov. 29, 2022], 7 pages, Retrieved from the Internet: <URL: https://chowdera.com/2022/02/202202280436422469.html>.

Van Den Oord, et al., "Neural Discrete Representation Learning," arXiv [online], May 30, 2018, 11 pages, arXiv:1711.00937v2, Retrieved from the Internet: <URL: https://arxiv.org/abs/1711.00937>.

International Searching Authority, "Notification of Transmittal of the International Search Report and the Written Opinion of the International Searching Authority, or Declaration," Patent Cooperation Treaty, Jun. 28, 2024, 7 pages, International Application No. PCT/IB2024/051279.

\* cited by examiner

ADJUSTING AUDIBLE AREA OF AVATAR'S VOICE

BACKGROUND

The present invention relates, generally, to the field of computing, and more particularly to mixed reality. Mixed reality is a field concerned with merging real and virtual worlds such that physical and digital objects co-exist and interact in real time. Mixed reality does not exclusively take place in either the physical or virtual worlds but is a hybrid of reality and virtual reality; as such, mixed reality describes everything in the reality-virtuality continuum except for the two extremes, namely purely physical environments, and purely virtual environments. Accordingly, mixed reality includes augmented virtuality (AV), augmented reality (AR) and virtual reality (VR). Mixed reality has found practical applications in such areas as remote working, construction, gaming, military, academic and commercial training, and in social networking.

Mixed-reality systems use software to generate images, sounds, haptic feedback, and other sensations to augment a real-world environment. While the creation of this augmented environment can be achieved with mobile devices such as cell phones or tablets, more specialized equipment is also used, typically in the form of glasses or headsets where computer generated elements are overlaid onto a view of the real world by being projected or mapped onto a lens in front of a user's eyes. With the help of computer augmentation, information about the surrounding world of the user, as well as other digital elements overlaid onto the world, become interactive and digitally manipulable.

One rising application of mixed reality is that of the mixed-reality social networks. In such applications, multiple individuals may be placed into a virtual reality environment, where they are each represented by virtual avatars, and may be able to see and freely interact with the avatars of other participants. The goal of the mixed reality social network is to virtually recreate a real-world social gathering in a mixed-reality environment, to allow individuals who are may not be or cannot feasibly be physically present with each other to interact and socialize in a fashion recreating in-person physical presence as faithfully as possible, within a mixed-reality space that can be accessed from their own home simply by donning a mixed-reality device. To this end, mixed-reality social networks must, in order to facilitate natural vocal communication and conversation between users, be capable of receiving the spoken voice of the user represented by the avatar and transmitting the recorded voice to other avatars in the mixed-reality environment in real time.

Because the mixed-reality environment is virtual, and the users are not or are not all physically located near each other, sound cannot propagate naturally through the virtual environment when spoken by a user. Instead, whether a user can hear another participant is typically dependent on whether the user and the participants have affirmatively and mutually opted-in to persistent shared voice channels, friend lists, single-instance calls, et cetera through a deliberate selection. However, a mixed-reality social network is designed to mimic a social gathering in the real world; to that end, the user's avatar may be placed into a virtual environment with those of individuals from all over the world, most of whom may be unknown to the user. To facilitate natural conversation, the mixed reality environment must allow the user to converse with previously unknown participants. Attempts have been made in the art to address this issue by, for example, requiring the user to select those participants who will be allowed to hear and/or be heard by the user, or filter which users can hear or be heard by the user based on different topics, intentions, group memberships, or any other criteria. This results in situations where the user must make manual selections or rules changes before communicating with an individual who is not enabled to hear the user. This places obstacles in the way of natural and effortless communication between users of the virtual reality environment.

Attempts have been made in the art to eliminate the need for user action before enabling the user to converse with other participants; currently in some attempted solutions in the art, virtual character existing in a virtual space is audible to everyone in a virtual environment. This is problematic in that in a large chatroom with many users, all users may be audible to each other, potentially resulting in an overwhelming amount of sound that may interfere with conversations or, in a particularly cacophonous situation, render audible communication entirely impossible or even damage the user's ears. Other attempted solutions in the art transmit the user's voice to every participant in the virtual environment whose avatar is located a predetermined distance from the user's avatar. However, certain challenges are presented by the size of the radius: if voices are transmitted too far within the virtual reality environment, the user might overhear or be overheard by conversations of participants they do not wish to communicate with. If voices are not transmitted far enough within the virtual reality environment, users may not be able to communicate with users that are far away. To address such issues, a user may have no other option but to manually adjust the radius, thereby reintroducing the requirement for user action that the voice transmission opt-in within the radius ostensibly appeared to eliminate.

SUMMARY

According to one embodiment, a method, computer system, and computer program product for adjusting an audible area of a user's voice within a mixed-reality environment is provided. The present invention may include receiving, at a microphone, a source audio; calculating, by a generative model, a voice propagation distance of a user based on the source audio, a received audio, and a templated text sentence describing a category of a mixed reality environment experienced by the user; drawing a virtual circle within the mixed reality environment centered on a user avatar representing the user and with a radius equal to the voice propagation distance; and transmitting the source audio to one or more participants within the mixed-reality environment represented by one or more participant avatars located within the virtual circle.

Such embodiment stands to address the challenges facing the art by allowing a user to see the radius of the circle describing the range within which the user's voice is audible to other participants in the mixed reality environment, and to automatically adjust the radius of that circle by simply changing the volume of the user's voice. This in turn allows the user to intuitively see and control who can hear the user, thereby improving user privacy, ease of communication between users, and user immersion, and reducing the emotional and physical attrition that can arise from participating in a mixed reality environment for prolonged periods; additionally, a volume-based voice propagation method eliminates instances of overwhelming noise resulting from hearing all participants in the mixed reality environment, and improves the interface between the user and the system by, for example, removing intermediate selection steps between encountering a participant in the mixed reality environment and conversing with them.

Furthermore, the invention may optionally comprise converting, by an audio-tokenization module and a text tokenizer, the source audio, the received audio, and the templated text sentence into a plurality of source audio tokens, received audio tokens, and text tokens; creating an input sequence comprising a first separator token, the source audio tokens, a second separator token, a third separator token, the received audio tokens, a fourth separator token, a fifth separator token, the text tokens, and a sixth separator token; and providing the input sequence to the generative model as input. Such audio-tokenization module may further comprise a per-chunk image-based audio tokenizer using a VQ-VAE model.

Aspects of the invention may preferentially comprise dynamically updating the circle to graphically represent the voice propagation distance of the source audio in real time as the user is speaking, allowing the user to modify the user's volume in mid-sentence to provide even more granular and intuitive control over who the user can be heard by.

Aspects of the invention may preferentially comprise the step of multiplying the voice propagation distance by a preset scaling factor, to normalize for any discrepancies between distances in the real world and distances within the mixed-reality environment.

Aspects of the invention may optionally include a generative model that has been trained via autoregressive language modeling.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
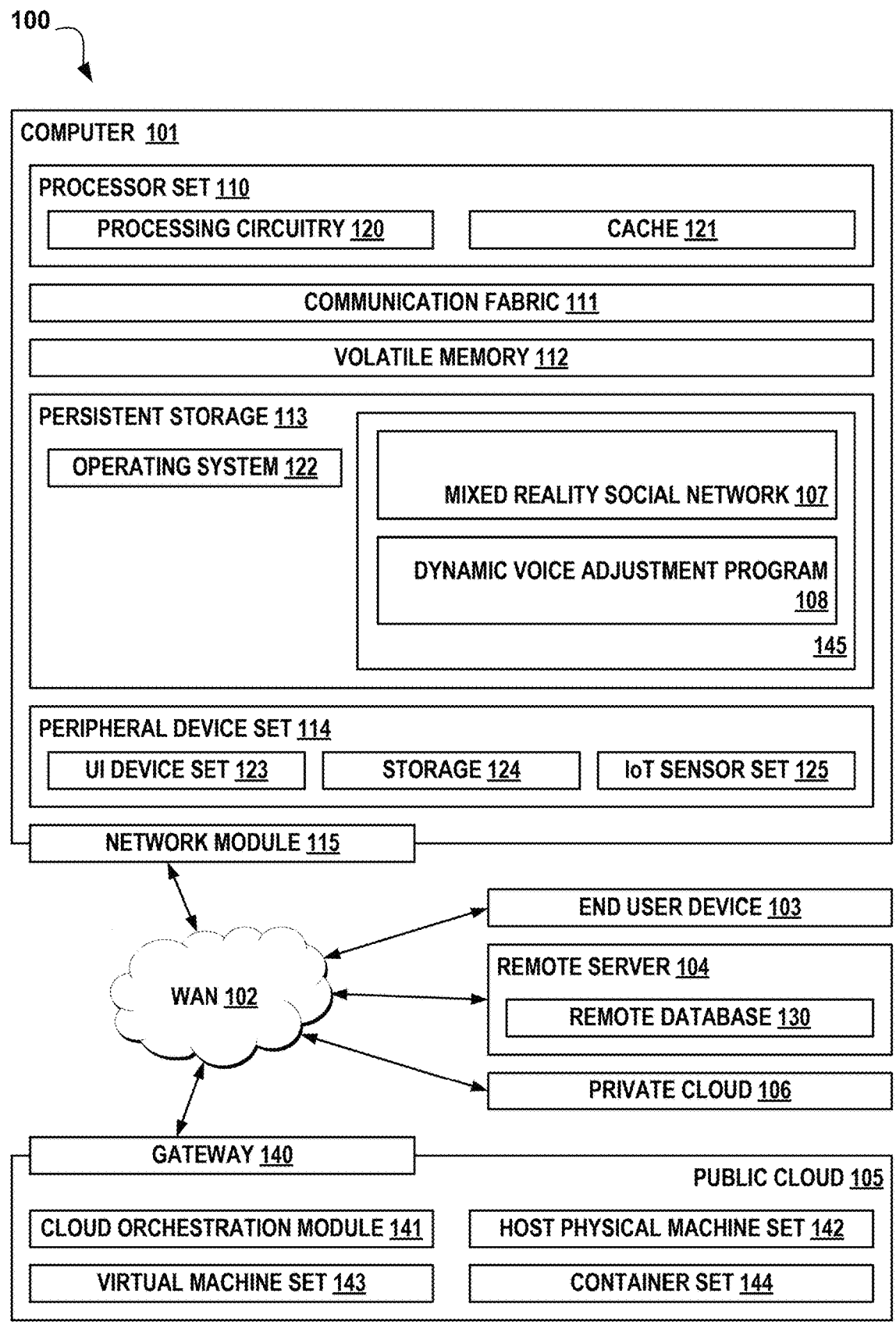
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to mixed reality. The following described exemplary embodiments provide a system, method, and program product to, among other things, dynamically adjust the audible area of a virtual avatar within a virtual environment utilizing a generative model of text which infers a sound propagation distance from a pair of source and received audio signals.

According to one or more embodiments, the invention is a method to dynamically and automatically adjust the audible area of a virtual character's voice in a mixed-reality environment by using a generative model that receives two audio inputs and a templated text sentence comprising the category of the mixed-reality environment, calculates a farthest propagation distance of the user's voice based on the output templated text sentence from the generative model, and draws a virtual circle around the user's avatar based on the voice propagation distance.

In one or more embodiments of the invention, the mixed-reality environment may be a hybrid environment comprising both physical and virtual elements. The mixed reality environment may comprise a hybrid physical-virtual world which one or more users may enter, see, move around in, interact with, et cetera through the medium of a mixed-reality device. The mixed reality environment may include augmented reality environments wherein generated images, sounds, haptic feedback, and other sensations are integrated into a real-world environment to create a hybrid augmented reality environment, comprising both virtual and real-world elements. The mixed reality environment may include virtual reality environments which fully replace the physical environment with virtual elements, such that a user experiencing a virtual reality environment cannot see any objects or elements of the physical world; however, the virtual reality environments are anchored to real-world locations, such that the movement of users, virtual objects, virtual environmental effects and elements all occur relative to corresponding locations in the physical environment. All users in a single mixed-reality environment may be able to see and/or interact with the same virtual objects and virtual elements, and may interact with virtual representations, or avatars, of each other.

In some embodiments of the invention, the mixed reality device may be any device or combination of devices enabled to record real-world information that the mixed reality program may overlay with computer-generated perceptual elements to create the mixed-reality environment; the mixed reality device may further record the actions, position, movements, et cetera of the user, to track the user's movement within and interactions with the mixed reality environment. The mixed reality device may display the mixed reality environment to the user. The mixed reality device may be equipped with or comprise a number of sensors such as a camera, microphone, accelerometer, et cetera, and/or may be equipped with or comprise a number of user interface devices such as displays, touchscreens, speakers, et cetera. In some embodiments, the mixed reality device may be a headset that is worn by the user.

In one or more embodiments of the invention, the user may be an individual interacting with the mixed-reality environment through the use of a mixed-reality device. The participants may be non-user individuals who are likewise interacting with the mixed-reality environment through the use of a mixed-reality device.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The following described exemplary embodiments provide a system, method, and program product to dynamically adjust the audible area of a virtual avatar within a virtual environment utilizing a generative model of text which infers a sound propagation distance from a pair of source and received audio signals.

Referring now to FIG. 1, computing environment 100 contains an example of an environment for the execution of at least some of the computer code involved in performing the inventive methods, such as code block 145, which may comprise mixed-reality social network 107 and dynamic voice adjustment program 108. In addition to code block 145, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 145, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 145 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in code block 145 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as mixed-reality headsets, goggles, and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a first microphone and another sensor may be a second microphone, where either the first or second microphone is integrated into a mixed-reality device. Other examples of sensors may include gyroscopes, cameras, LIDAR, accelerometers, et cetera for head tracking, motion tracking, tilt detection, and other such functions.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the mixed-reality social network 107 may be a program capable of creating and maintaining a mixed-reality environment and enabling individuals to connect to and interact with the mixed-reality environment and each other through the use of avatars. Avatars may be three-dimensional virtual characters that represent an individual. The individual to which the avatar corresponds may be bound to the single perspective and location of the avatar but may control the movements and actions of the avatar to navigate and interact with the mixed-reality environment and other avatars, objects, or other virtual elements within the mixed-reality environment. The individual to which the avatar corresponds may additionally control the appearance, dimensions, and other characteristics of the avatar. In some embodiments, portions of the avatar, such as the hands and/or head, may be directly mapped to their physical counterparts on the individual to whom the avatar corresponds, such that as the individual moves a mapped body part, the avatar executes the same motion with the matching virtual body part. The mixed-reality social network 107 enables individuals such as the user and other participants to interact through audible speech. The mixed-reality social network 107 may comprise, be integrated with, or otherwise be configured to interoperate with dynamic voice adjustment program 108.

According to the present embodiment, the dynamic voice adjustment program 108 may be a program enabled to dynamically adjust the audible area of a virtual avatar within a virtual environment utilizing a generative model of text which infers a sound propagation distance from a pair of sources and received audio signals. The dynamic voice adjustment program 108 may, when executed, cause the computing environment 100 to carry out a dynamic voice adjustment process 200. The dynamic voice adjustment process 200 may be explained in further detail below with respect to FIG. 2. In embodiments of the invention, the dynamic voice adjustment program 108 may be stored and/or run within or by any number or combination of devices including computer 101, end user device 103, remote server 104, private cloud 106, and/or public cloud 105, peripheral device set 114, and server 112 and/or on any other device connected to WAN 102. Furthermore, dynamic voice adjustment program 108 may be distributed in its operation over any number or combination of the aforementioned devices. The dynamic voice adjustment program 108 may, in embodiments, be a module or subcomponent of mixed-reality social network 107, operate as an independent application called by or in communication with mixed-reality social network 107, or otherwise interoperate with mixed-reality social network 107.

Figure 2:
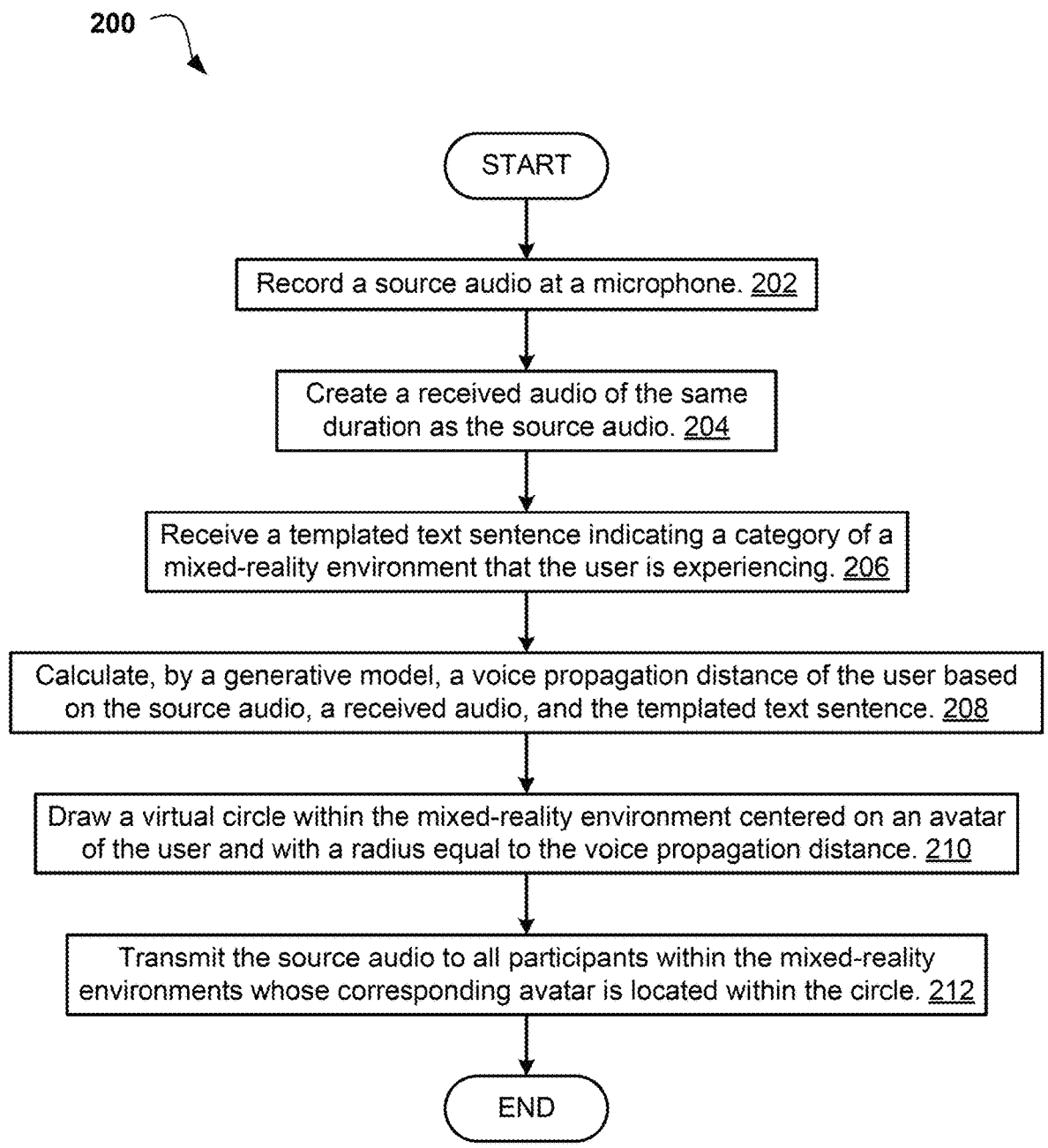
FIG. 2 is an operational flowchart illustrating a dynamic voice adjustment process according to at least one embodiment.

Referring now to FIG. 2, an operational flowchart illustrating a dynamic voice adjustment process 200 is depicted according to at least one embodiment. At 202, the dynamic voice adjustment program 108 may record a source audio using a microphone. The dynamic voice adjustment program 108 may operate, be integrated with or otherwise in communication with a microphone which may be integrated with the mixed-reality device of the user or otherwise near to or on the person of the user, such that audio recorded by the microphone, or 'source audio,' possesses volume characteristics that are as close as possible to that of the original user utterance made by the user and recorded by the microphone as source audio.

At 204, the dynamic voice adjustment program 108 may create a received audio of the same duration as the source audio. During the inference, or non-training, phase of the trained model, the received audio may comprise zero-decibel audio of the same length of the source audio to facilitate audible-area adjustment. By setting the received audio to zero decibels, the dynamic voice adjustment program 108 may predict the farthest distance that the source audio will propagate; in other words, the distance at which the source audio attenuates to zero decibels. In some embodiments, for example, a zero-decibel audio clip with very short duration, such as 1 millisecond, may be pre-stored in advance by the dynamic voice adjustment program 108. Where an input source audio's duration is 5 milliseconds, the 1-millisecond 0-decibel audio clip may be duplicated 5 times, and the five 0-decibel audio clips may be concatenated in order to create a 0-decibel audio with a duration of 5 milliseconds as the input received audio. In this way, an input source sound is simulated to attenuate to 0 decibels, and the trained model may predict the related farthest voice propagation distance.

At 206, the dynamic voice adjustment program 108 may receive a templated text sentence indicating a category of a mixed-reality environment that the user is experiencing. A templated text sentence may be a text sentence which has been converted into a sequence of text tokens by a text tokenizer. Text tokens comprise subcomponents of text corresponding to individual syllables, phonemes, and/or even words which together make up the completed sentence; for example, in the sentence "the frog hopped over the log," a text tokenizer may break the sentence into the following sequence of tokenized words: ['the', 'frog', 'hopped', 'over', 'the', 'log']. All tokenized words form a vocabulary, wherein each word is assigned a unique index. A text token is a one-hot encoding embedding, such as a vector. For example, if the vocabulary contains only three words and the assigned index of word "frog" is 2. Then, the text token of word "frog" is a one-hot encoding vector [0, 0, 1]. One-hot encoding is a process of defining data variables as a vector of integers, where one integer is high, and the rest are low. One-hot encoding is best suited to machine-learning paradigms where the features to be defined, such as text and/or audio, are nominal, and lack any sort of natural order/ordinal relationship; in such scenarios, an integer or label encoding model might lead a machine learning model to infer an ordinal relationship where none exist, resulting in errors; for example, a machine learning model may mistakenly assume that higher numbers are more important. A one-hot learning model avoids such errors.

In embodiments, the text sentence may comprise a template which follows a consistent structure and comprises a template parameter; for example, the test sentence may read "sound propagates in a [site_category]." The term "[site_category]" is an example of a template parameter, and may be filled in by a user, a human programmer, the mixed reality social network 107, or some other agent with a category broadly describing the mixed-reality environment in terms that might allow dynamic voice adjustment program 108 to infer the general acoustic characteristics of the mixed-reality environment, such as "meeting room" or "forest glade" or "cave" or "open-plan house." If the template parameter has not been filled in, the dynamic voice adjustment program 108 may automatically infer the template parameter based on attributes of the mixed-reality environment through, for example, classification techniques such as a trained deep-learning classification model. For example, a visual tagline displayed in a virtual environment saying "company annual all-hands meeting" may imply a large virtual meeting room. A virtual environment that is full of virtual avatars who look like doctors and patients may imply a virtual hospital. A virtual room with a big virtual movie screen may imply a virtual cinema. Some key words in content that other virtual avatars are talking about, such as "project," "development" and "bug," may imply a virtual project meeting room. The dynamic voice adjustment program 108 may analyze such visual, audible, and/or textual details of the mixed-reality environment to infer characteristics of the mixed-reality environment, and select a template parameter that evokes, implies and/or describes such characteristics. Once acquired, the dynamic voice adjustment program 108 may tokenize the filled-in parameter as a text token.

At 208, the dynamic voice adjustment program 108 may calculate, by a generative model, a voice propagation distance of the user based on the source audio, a received audio, and the templated text sentence. The generative model may be a machine learning algorithm which receives, as input, a dual-modal sequence which may be sequentially composed of the templated text sentence, including a category of an environment where a user utterance propagates, the source audio, and the received audio. The model may provide as output a templated text sentence, wherein the output templated text sentence includes a template parameter comprising a predicted value, multiplied, for example, by 0.5, that represents the number of meters that a sound from a source propagates to the location where received audio is obtained. The predicted value may be multiplied by 0.5, for example, in embodiments where the distance between a first and a second microphone may be 5 meters when collecting training data. The related templated text sentence defining the propagation distance as a target output is, "Sound propagation distance is [ten] times 0.5 meters." Thus, the model predicts an integer value such as ten, that is, a multiple, for five meters; if one was to multiply 10 by 0.5 one would end with 5. In embodiments of the invention, "0.5 meters" may be considered as a hyperparameter. Other embodiments may set alternate values for the hyperparameter.

In some embodiments, the generative model may be trained through left-to-right token prediction, also known as autoregressive language modeling; left-to-right token prediction may be best suited in applications where the output is a sequence of text tokens forming a phrase or sentence, which will be parsed from left to right by the human user or software program. During the training stage, the generative model may be provided with training data. Each element of training data may comprise a manually annotated templated text sentence defining the site category, such as a shopping store, a source audio, a received audio, and a templated text sentence defining the propagation distance as a target output. The generative model may be trained until it converges. The training process of the generative model may be discussed in further detail with respect to FIG. 7.

At 210, the dynamic voice adjustment program 108 may draw a virtual circle within the mixed-reality environment centered on an avatar of the user and with a radius equal to the voice propagation distance. Here, dynamic voice adjustment program 108 may generate a virtual element within the mixed-reality environment that describes a circle, where the circle represents the maximum distance from the user's avatar that the user utterance emanating from the user would propagate in a real-world analogue of the mixed-reality environment before attenuating to zero decibels, and describes the region of the mixed-reality environment where the user's utterance will be audible to others, such that participants represented by avatars that are located within the circle will be able to hear the user utterance but participants represented by avatars that are outside of the circle will not be able to hear the user utterance. The circle may be generated to lay on top of terrain and/or be visible through obstacles, and may be visible only to the user, visible to only the user and those participants that the user has selected or otherwise designated as belonging to a group able to see the circle, or visible to everyone. The circle may be continuously redrawn to reflect the position of the user's avatar, such that it remains centered on the user's avatar even as the avatar moves. In some embodiments, the default setting may be to automatically adjust the audible area based on the volume of a user's voice issuing from the user's throat; however, in some embodiments, dynamic voice adjustment program 108 may enable the user to make manual adjustments to the circle, for example to increase the radius of the circle to reduce the volume at which a naturally soft-spoken user might need to speak to be audible at a certain distance. Volume-based sound propagation provides a simulation of dynamically adjusting sound-propagation distance in the real world to improve the immersion of individuals within the mixed-reality social network 107, making for a convenient, natural, and intuitive user experience, and reducing the attrition of spending time within a mixed-reality environment.

In some embodiments of the invention, the circle may be tied to an individual user utterance and may be drawn in real time to reflect the volume of that user utterance as it is being spoken by the user and/or transmitted within the mixed reality environment. The circle may disappear once the user utterance has finished being spoken and/or transmitted, may linger for a predetermined amount of time afterwards before disappearing, and/or may linger until the next user utterance is perceived before disappearing, et cetera. The user utterance may be any sound emitted by the user ranging anywhere between an individual phoneme to an entire sentence. In some embodiments of the invention, the circle may be redrawn in real time to reflect volume changes within the user utterance. For example, by default, the circle may be drawn to reflect the volume of a sentence; upon receiving the source audio from the user comprising a sentence, the dynamic voice adjustment program 108 may determine the propagation distance and redraw the circle for that sentence. However, the granularity may be adjusted, either automatically by the dynamic voice adjustment program 108 or manually through user selection, such that dynamic voice adjustment program 108 redraws the circle to illustrate the farthest propagation distance of individual phrases, words, or even syllables. In some embodiments, dynamic voice adjustment program 108 may redraw the circle at regular intervals as the user utterance is being received, to illustrate the volume of the user utterance in real time at each successive interval.

At 212, the dynamic voice adjustment program 108 may transmit the source audio to all participants within the mixed-reality environments whose corresponding avatar is located within the circle. In some embodiments, the dynamic voice adjustment program 108 may measure only horizontal distance from the user's avatar in determining the boundary of the voice propagation distance, such that the circle describes a cylindrical volume extending upwards and downwards to the boundaries of the mixed reality environment. In some embodiments, the dynamic voice adjustment program 108 may measure both horizontal and vertical distance from the user's avatar such that the circle describes a spherical volume with its center point located on the user's avatar. In either case, individuals may still hear the user so long as they stay within the volume described by the circle.

In some embodiments, dynamic voice adjustment program 108 may modify the source audio before transmitting it to one or more participants whose avatars are within the volume described by the circle. For example, the dynamic voice adjustment program 108 may attenuate the volume of the source audio based on the horizontal or total distance of the participant's avatar from the avatar of the user, such that the farther the participant's avatar is, the quieter the user sounds to that participant, thereby mimicking real-world sound propagation. In another example, the dynamic voice adjustment program 108 could reduce the volume of the source audio to a predetermined volume or by a predetermined amount if the source audio exceeds a predetermined loudness threshold, where the loudness threshold represents a volume at which the source audio may be undesirably loud to a participant.

Figure 3:
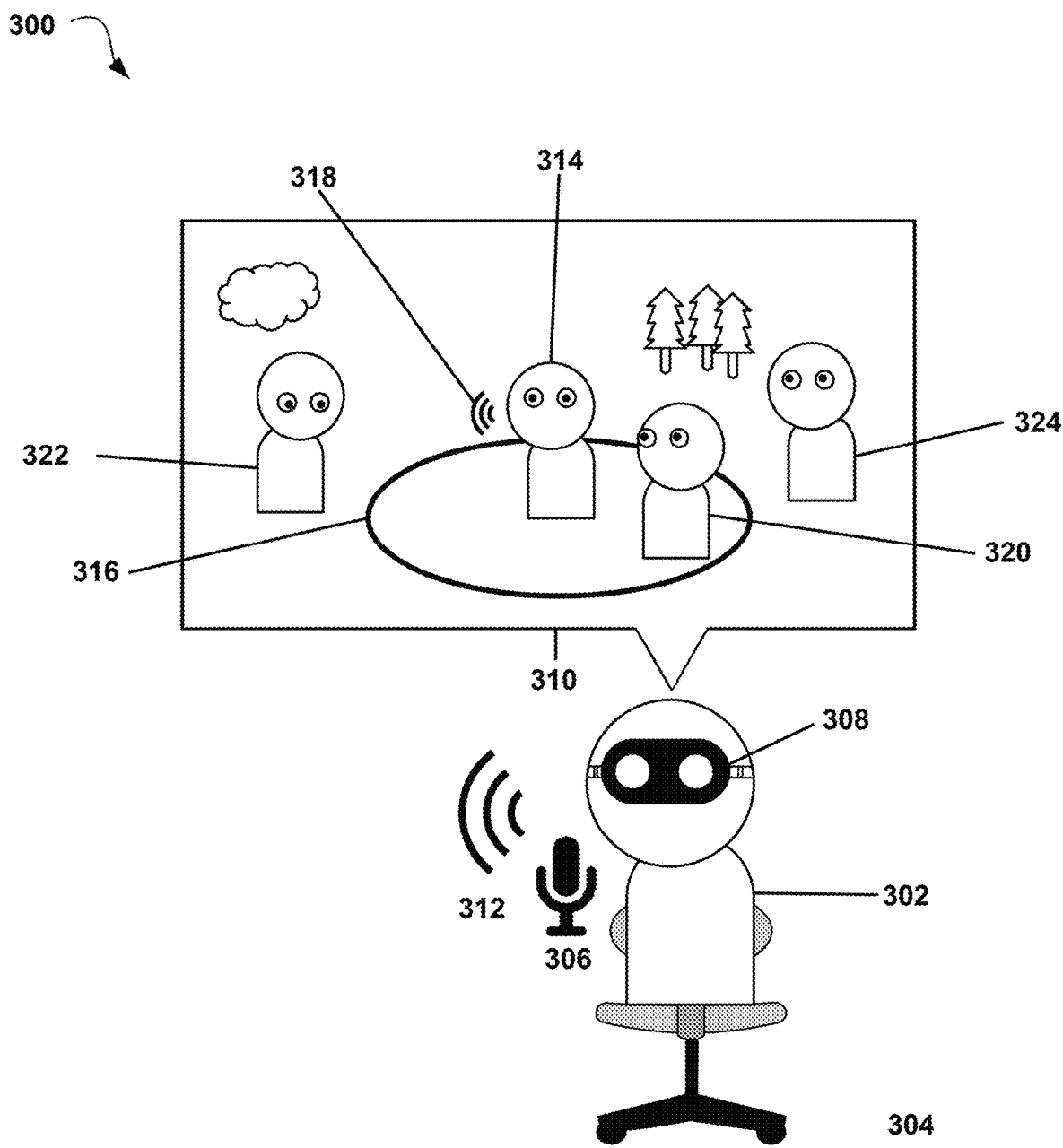
FIG. 3 illustrates an exemplary use case of a system implementing the dynamic voice adjustment process according to at least one embodiment.

Referring now to FIG. 3, an exemplary use case 300 of a system implementing the dynamic voice adjustment process 200 is illustrated according to at least one embodiment. Here, a user 302 is located within a physical environment 304 which comprises a microphone 306 located close to and/or on the person of user 302. The user 302 is wearing a mixed-reality headset 308, through which user 302 is experiencing a mixed-reality environment 310, where the user 302 is represented by an avatar 314. The microphone 306 may be integrated into the mixed-reality headset 308 of the user 302. The user 302 has just called the name of a friend, producing a user utterance 312. The user utterance 312 is recorded by microphone 306 as source audio 318. The dynamic voice adjustment program 108 identifies the voice propagation distance of the user utterance 312 and draws a circle 316 within the mixed-reality environment 310. Avatar 320 is located within the circle 316, so the dynamic voice adjustment program 108 transmits the source audio 318 to the user represented by avatar 320. A second avatar 322 and a third avatar 324 are also present in the mixed-reality environment, but because they are not located within the circle 316, dynamic voice adjustment program 108 does not transmit the source audio 318 to the second avatar 322 and third avatar 324. The three-dimensional space, here a vertical cylinder, enclosed by the drawn circle 316 is the only area in which the voice of the user 302 can be heard by others. To dynamically enlarge or shrink the audible area of the user's 302 voice by adjusting the radius of the drawn circle 316, the user 302 merely needs to change the volume of the user's 302 voice issuing from the user's 302 physical throat in real time.

Figure 4:
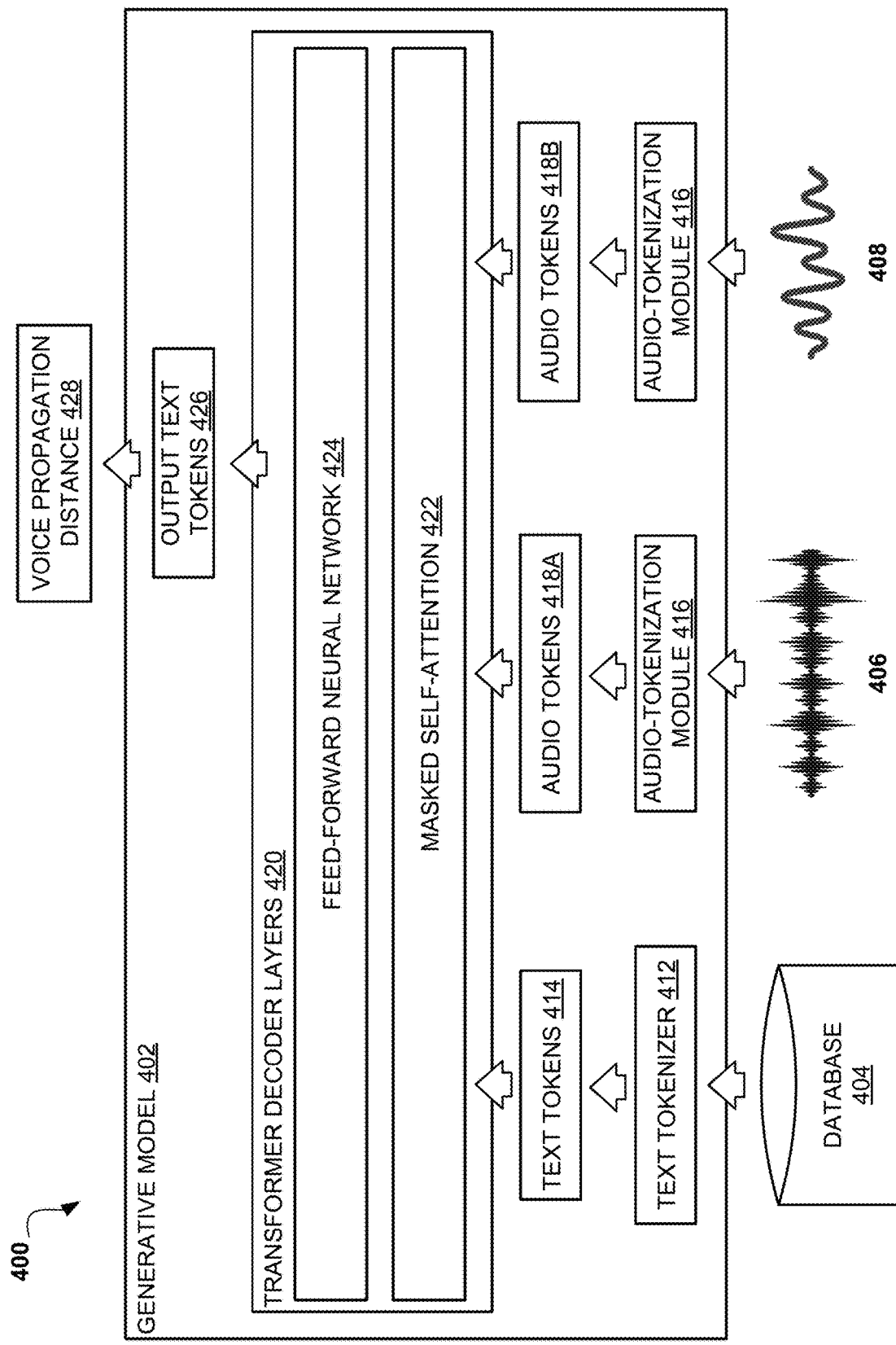
FIG. 4 is a diagram illustrating an exemplary generative model of a system implementing the dynamic voice adjustment process according to at least one embodiment.

Referring now to FIG. 4, a diagram illustrating the operation 400 of an exemplary generative model 402 implementing the dynamic voice adjustment process 200 is depicted according to at least one embodiment. Here, a generative model 402 is provided with three inputs, a templated text sentence from a database 404, a source audio 406, and a received audio 408. The templated text sentence is provided to a text tokenizer 412 to produce text tokens 414, the source audio 406 is provided to an instance of an audio-tokenization module 416 to produce audio tokens 418A and the received audio 408 is provided to another instance of an audio-tokenization module 416 to produce audio tokens 418B. The audio tokens 418A, B may comprise a series of one-hot encoding vectors, for example [0, 0, . . . , 1, 0, 0], which represent individual millisecond-long chunks of audio which together comprise the source audio. The dynamic voice adjustment program 108 creates an input sequence from the text tokens 414 and the audio tokens 418A, B, by ordering the tokens sequentially with separator tokens between them. Separator tokens may be placeholder tokens which describe neither sound nor text snippets, but which serve as boundaries between the text tokens 414 and the audio tokens 418A, B to allow the generative model 402 to more easily parse and distinguish the respective input tokens. An example input sequence may comprise the following sequence of tokens: a first text separator token, the text tokens 414, a second text separator token, a first audio separator token, the source audio tokens 418A, a second audio separator token, a third audio separator token, the received audio tokens 418B, and a fourth audio separator token. The separator tokens serve as boundaries, bracketing the text tokens 414, the audio tokens 418A, and the audio tokens 418B, respectively. Text tokens 414, separator tokens and audio tokens 418A, B all share the same one-hot encoding embedding space; for example, text tokens 414 and separator tokens ranging from 0 to M and audio tokens 418A, B ranging from M+1 to M+K. This means that the dimension of a text/separator/audio token, i.e., the vector dimension, is the same for all tokens. Utilizing different tokens that utilize the same embedding space can allow dynamic voice adjustment program 108 to differentiate between text or separator tokens and audio tokens. For example, in embodiments with two very small embedding spaces, the token indices of the first embedding space may comprise text tokens are 0~1 and corresponding one-hot encoding text embeddings may be (1,0) and (0.1). In the second embedding space, the token indices of audio tokens may also be 0~1 and corresponding one-hot encoding audio embeddings are also (1,0) and (0,1). If a probability distribution P(u) output from a model, here indicating the last transformer decoder layer, is (0.2, 0.8), then the model would not know to map the output to the text embedding (0,1) or the audio embedding (0,1).

In embodiments, the input sequence of tokens is fed sequentially into a transformer decoder comprising multiple transformer decoder layers 420, each layer comprising a masked self-attention 422 and feed-forward neural network 424. The masked self-attention 422 may be a component of the transformer decoder layers 420 and the multi-head attention blocks used in the decoder and may utilize self-attention causality to force predictions to only attend to the tokens at previous positions. The generative model 402 adopts left-to-right token prediction and masked self-attention 422 makes such prediction feasible when using transformer decoder layers 420. The feed-forward neural network (FNN) 424 may be an artificial neural network in which data and calculations flow in a single direction, from the input data to the outputs. The role and purpose of the FNN 424 is to process the output from one attention layer in a way to better fit the input for the next attention layer.

The last transformer decoder layer 420 then outputs output text tokens 426 of the templated text sentence, which contains a predicted value of the template parameter. The generative model 402 then calculates the farthest distance that the sound of the source audio 406 can propagate by multiplying the predicted value of the template parameter from the output templated text sentence by 0.5. The distance will be multiplied by a preset scaling factor, for example in embodiments where the lengths of one meter in virtual and real environments are not equal, to normalize any discrepancy between real and virtual distances and prevent inaccurate voice propagation distance predictions that might otherwise result. The generative model 402 then outputs normalized voice propagation distance 428.

Figure 5:
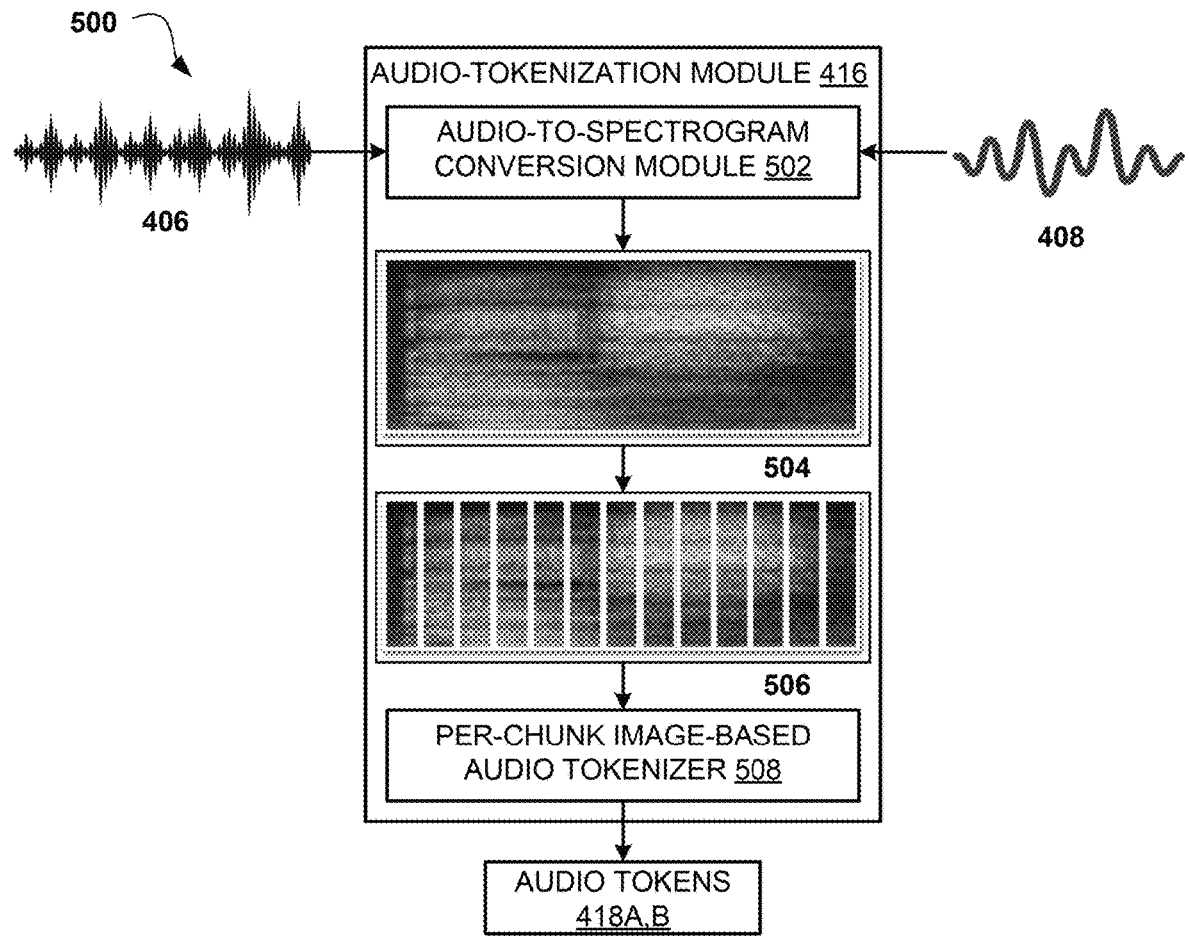
FIG. 5 is a diagram illustrating an exemplary audio-tokenization module of a generative model according to at least one embodiment.

Referring now to FIG. 5, a diagram illustrating the operation 500 of an exemplary audio-tokenization module 416 of a generative model 402 is depicted according to at least one embodiment. The audio-tokenization module 416 converts the input audio into a spectrogram 504, which is a 2D image of sound, and which graphically represents the frequencies that comprise the sound. Here, the input sound comprises the source audio 406, representing a recorded version of the original user utterance, which may comprise a sentence. In some embodiments, for example during a training phase where the received audio 408 is greater than zero decibels, the input sound may comprise received audio 408. The audio-tokenization module 416 then divides the spectrogram 504 into chunks 506, each chunk 506 representing a short segment of the original source audio 406, with a duration on the scale of milliseconds. Here, source audio 406 and/or received audio 408 are converted into a sequence of audio tokens 418A, B through the operation of audio-tokenization module 416. Audio-tokenization module 416 first converts audio (either source audio 406 or received audio 408) to a spectrogram 504 through an audio-to-spectrogram conversion module 502; secondly, the audio-tokenization module 416 divides the resulting spectrogram 504 into small chunks 506 of the same duration, with a size 257×t×3, where t is in milliseconds. The audio-tokenization module 416 divides the spectrogram 504 into small chunks 506 because otherwise, a converted spectrogram 504 from a source audio will be too wide to tokenize. The per-chunk audio tokenizer 508 is image-based, so the input image, i.e., the spectrogram chunk 506, must not be too wide. Finally, audio-tokenization module 416 uses a per-chunk image-based audio tokenizer 508 to convert each spectrogram chunk into an audio token, outputting audio tokens 418A, B. The per-chunk image-based audio tokenizer 508 may be discussed in greater detail below with respect to FIG. 6.

Figure 6:
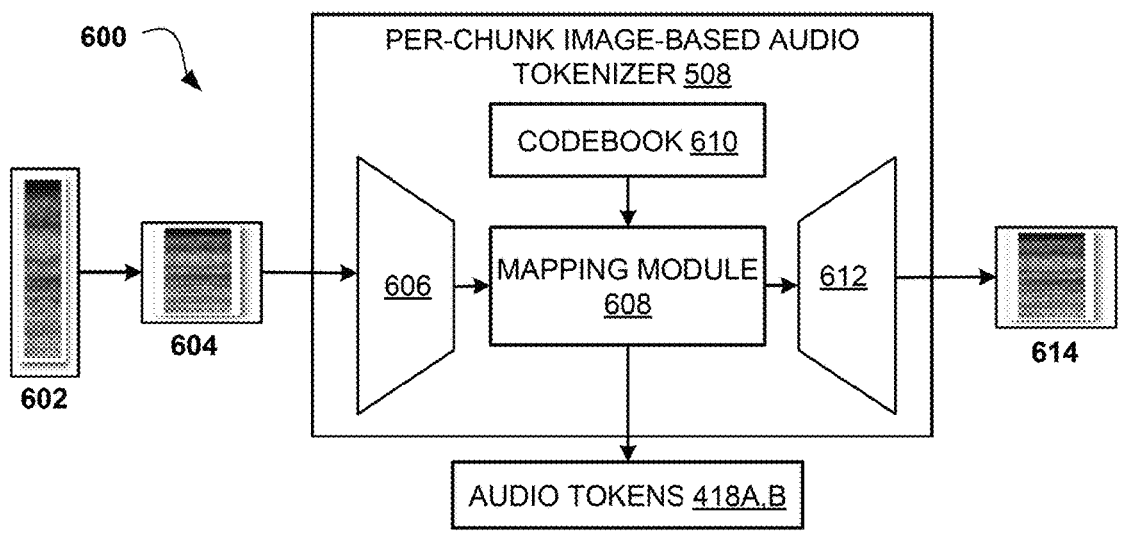
FIG. 6 is a diagram illustrating an exemplary per-chunk image-based tokenizer of an audio-tokenization module of a generative model according to at least one embodiment.

Referring now to FIG. 6, a diagram illustrating the operation 600 of an exemplary per-chunk image-based audio tokenizer 508 of an audio-tokenization module 416 of a generative model 402 is depicted according to at least one embodiment. Here, a per-chunk image-based audio tokenizer 508 uses a VQ-VAE model as an image-based tokenizer in order to convert a single spectrogram chunk 602 selected from the spectrogram chunks 506 comprising the source audio 406 or the received audio 408 into an audio token 418A,B, resulting in audio tokens 418A,B comprising an audio token 418A,B corresponding to each spectrogram chunk 602 comprising the spectrogram 506. In other words, the per-chunk image-based audio tokenizer 508 here converts the spectrogram chunk 602 into a one-hot encoding vector of dimension (M+K), where M is the total number of text and separator tokens in this embodiment, and K is the total number of embeddings in the learnable codebook 610. The VQ-VAE model is an image auto-encoder model, the training of which does not rely on annotated labels as ground truth. With the trained encoder 606 and codebook 610, the feature vector from the encoder 606 can be quantized into an integer, for example an index of a certain codebook embedding. This integer can be converted into a one-hot encoding vector, or audio token 418A, B. The encoder 606 is a multi-layer convolutional neural network with 1024 hidden units and ReLU activation in each layer. Each layer has a receptive field of 4 and a stride of 2 to half the width and height of an input image, such as a reshaped spectrogram-chunk image 604. The decoder 612 has the same architecture as the encoder 606 but replaces convolution with deconvolution. The decoder 612 functions to reconstruct an image into an output image 614 that is the same as the input image received by the encoder 606; that is, reconstructed image 614 is expected to be the same as the input image 604, thereby ensuring that the per-chunk image-based audio tokenizer 508 is working correctly. The decoder 612 is only used during training; after training, only the encoder 606, the mapping module 608, and the codebook 610 are used for tokenizing the spectrogram chunk 602 into audio tokens 418A, B. The encoder 606, decoder 612 and codebook 610 are trained just like VQ-VAE, with all spectrogram chunks 602, which may be converted from available audios in a pre-collected training data.

Here, the per-chunk image-based audio tokenizer 508 reshapes the input spectrogram chunk 602 with the size of 257×t×3 (t indicates milliseconds) into an image 604 with the size of P×P×3. Then, per-chunk image-based audio tokenizer 508 encodes the reshaped chunk 604 into a 1024-dimensional feature vector through the trained encoder 606. Then, the mapping module 608 looks up a codebook embedding in codebook 610 that is most similar to the feature vector through the nearest-neighbor mapping. The index, ranging from 1 to K, of the mapped embedding in the learnable codebook 610 is converted, by the per-chunk image-based audio tokenizer 508, to a one-hot encoding vector of dimension (M+K) as the final audio token 418A, B of the original input spectrogram chunk 602.

Figure 7:
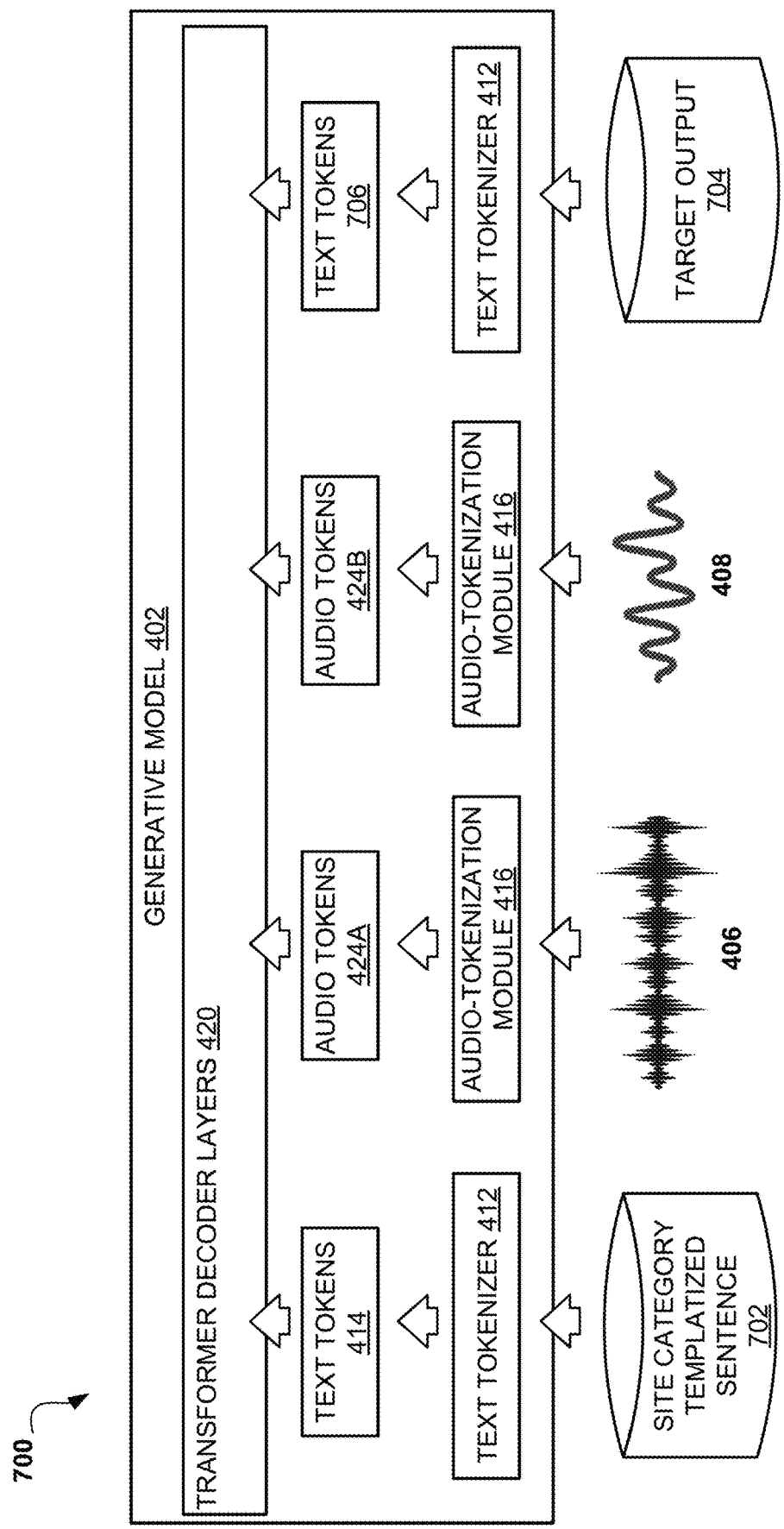
FIG. 7 is a diagram illustrating a training mode of the generative model according to at least one embodiment.

Referring now to FIG. 7, a diagram illustrating a training process 700 of the generative model 402 is depicted according to at least one embodiment. Here, the training process 700 employs left-to-right token prediction, a.k.a. autoregressive language modeling, to train generative model 402 on pre-collected training data. Each element of pre-collected training data includes a manually annotated category of a site (e.g., a shopping store) 702, a source audio 406, a received audio 408, and a target output sound-propagation distance (represented here as multiples of 0.5 meters). The received audio 408 may be of the same length as the source audio 406 and may either be zero decibels to train the generative model 402 to predict the farthest propagation distance, or some non-zero decibel level to train the generative model to predict the propagation distance at which the received audio has attenuated to that non-zero decibel level. Training the generative model 402 to recognize propagation distances where the received audio has attenuated to a non-zero decibel level increases the flexibility and functionality of the dynamic voice adjustment program 108, and may, for example, enable embodiments where the transmitted source audio 318 in the mixed reality environment 310 is attenuated in volume based on the distance between a participant 320 and the user's avatar 314.

In some embodiments, the dynamic voice adjustment program 108 may record training data itself, in which case the dynamic voice adjustment program 108 may operate or otherwise be in communication with a second microphone; when collecting training data for the generative model, the second microphone may be disposed a distance of, for example, several meters away from the first microphone, although the second microphone may be located anywhere between directly next to the first microphone to the furthest propagation distance of the source utterance. The audio recorded at the second microphone may be used as received audio. The source audio and the received audio are two different recordings of the same user utterance produced by the user; as such, they are of identical length and may differ only in volume, with the source audio being of a higher volume than that of the received audio. For the simplicity of implementation, the distance between the first and second microphones may comprise integer multiples of 0.5 meters, such as 0.5, 1, 1.5, ..., K*0.5 (K is a very large integer), wherein K*0.5 meters can be considered as the maximum distance a human voice can propagate in physical world, at which the volume of the received audio would have attenuated to zero decibels.

To build the training dataset, the dynamic voice adjustment program 108 may collect the four components of each training data element by playing training audio of human voices at different volume levels, recording the training audio as source audio by a first microphone, and recording the training audio as received audio at a second microphone disposed at different propagation distances in real-world sites.

The dynamic voice adjustment program 108 may conduct the training process 700 by randomly selecting an element of training data. For each randomly selected element of training data, the model 402 takes in as input a templated text sentence such as "sound propagates in a [site_category]." where [site_category] is assigned with the site category from the training data, the source audio 406 and received audio 408. The generative model 402 also takes in a templated text sentence, here "sound propagation distance is [ $\mathcal{K}$ ] times 0.5 meters," as a target output 704, where [ $\mathcal{K}$ ] is assigned with the corresponding sound-propagation distance from the training data. An input sequence is sequentially composed of text, separator, and audio tokens converted from the three inputs and the target output through the text tokenizer 412 or audio-tokenization module 416, as follows: a first text separator token, the text tokens 414, a second text separator token, a first audio separator token, the source audio tokens 418A, a second audio separator token, a third audio separator token, the received audio tokens 418B, a fourth audio separator token, a third text separator token, the text tokens 706, and a fourth text separator token, wherein separator tokens are added as the boundaries between text and audio tokens. The generative model 402 pads the input sequence to a length that is an integer multiple of 512 and feeds each token of the input sequence into the unidirectional transformer decoder layers 420 one by one in order to train it. Generally, the length of transformer model's input sequence is fixed as 128, 256, 512, 1024, et cetera. If the input sequence is less than the fixed length, the generative model 402 may add padding tokens, which are placeholder tokens analogous to the separator tokens, to the end of the input sequence to lengthen the sequence to the fixed length. The dynamic voice adjustment program 108 may continue to train the generative model 402 in this way until the weights of the model converge. Convergence refers to the state where the gradient change of the model tends to be flat during the training process, at which point the generative model 402 has reached threshold levels of accuracy and the training is completed.

In some embodiments of the invention, the generative model 402 may operate as follows during the training process 700: in this example, the input token sequence is referred to as $\mathcal{U} = \{u_1, \ldots, u_m\}$, wherein $u_i$ is a text/audio/separator token and m is the total length of the input token sequence. In this case, the training uses an autoregressive language modeling objective to maximize the following likelihood:

$$L_1(\mathcal{U}) = \sum_i \log P(u_i | u_{i-k}, \ldots, u_{i-1}; \theta)$$

where $k$ is the size of the context window (e.g., if i=3, k=2), and the conditional probability $P$ is modeled using a neural network with parameters $\theta$ (e.g., the generative model 402, a multi-layer unidirectional Transformer decoder). Those parameters are trained using stochastic gradient descent. The generative model 402 applies a multi-headed self-attention operation over the input token sequence followed by position-wise feedforward layers to produce an output distribution over target tokens:

$$h_0 = UW_e$$
$$h_l = \text{transformer\_block}(h_{l-1}) \quad \forall\, i \in [1, n]$$
$$P(u) = \text{softmax}(h_n W_e^T)$$

where $U = (u_{-k}, \ldots, u_{-1})$ is the context vector of tokens, n is the number of transformer decoder layers, $W_e$ is the token embedding matrix. Each $P(u_i)$ is a probability distribution and can be mapped to a one-hot encoding embedding as a predicted token. For example, suppose one-hot encoding embedding is a three-dimensional vector and $P(u_i) = (0.1, 0.8, 0.1)$, then the mapped token is $(0, 1, 0)$ according to the dimension whose probability value (e.g., 0.8) is highest. Based on the input token sequence and the predicted token sequence, the corresponding loss is calculated, such as a cross entropy loss.

It may be appreciated that FIGS. 2-7 provide only illustrations of individual implementations and do not imply any limitations with regard to how different embodiments may be implemented.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
   receiving, at a microphone, a source audio;
   creating a zero-decibel received audio with a same duration as the source audio;
   calculating, by a generative model, a voice propagation distance of a user based on the source audio, the received audio, and a templated text sentence describing a category of a mixed reality environment experienced by the user;
   drawing a virtual circle within the mixed reality environment centered on a user avatar representing the user and with a radius equal to the voice propagation distance; and
   transmitting the source audio to one or more participants within the mixed-reality environment represented by one or more participant avatars located within the virtual circle.

2. The method of claim 1, further comprising:
   converting, by a text tokenizer and an audio-tokenization module, the source audio, the received audio, and the templated text sentence into a plurality of source audio tokens, received audio tokens, and text tokens.

3. The method of claim 2, further comprising:
   creating an input sequence comprising a first separator token, the source audio tokens, a second separator token, a third separator token, the received audio tokens, a fourth separator token, a fifth separator token, the text tokens, and a sixth separator token; and
   providing the input sequence to the generative model as input.

4. The method of claim 2, wherein the audio-tokenization module comprises a per-chunk image-based tokenizer using a VQ-VAE model.

5. The method of claim 1, wherein the circle is dynamically updated to graphically represent the voice propagation distance of the source audio in real time as the user is speaking.

6. The method of claim 1, wherein the voice propagation distance is multiplied by a preset scaling factor.

7. The method of claim 1, wherein the generative model is trained through autoregressive language modeling.

8. A computer system comprising:
   one or more processors, one or more computer-readable memories and one or more computer-readable storage media;
   program instructions, stored on at least one of the one or more storage media for execution by at least one of the one or more processors via at least one of the one or more memories, to receive, at a microphone, a source audio;
   program instructions, stored on at least one of the one or more storage media for execution by at least one of the one or more processors via at least one of the one or more memories, to create a zero-decibel received audio with a same duration as the source audio;
   program instructions, stored on at least one of the one or more storage media for execution by at least one of the one or more processors via at least one of the one or more memories, to calculate, by a generative model, a voice propagation distance of a user based on the source audio, the received audio, and a templated text sentence describing a category of a mixed reality environment experienced by the user;
   program instructions, stored on at least one of the one or more storage media for execution by at least one of the one or more processors via at least one of the one or more memories, to draw a virtual circle within the mixed reality environment centered on a user avatar representing the user and with a radius equal to the voice propagation distance; and
   program instructions, stored on at least one of the one or more storage media for execution by at least one of the one or more processors via at least one of the one or more memories, to transmit the source audio to one or more participants within the mixed-reality environment represented by one or more participant avatars located within the virtual circle.

9. The computer system of claim 8, further comprising:
   program instructions, stored on at least one of the one or more storage media for execution by at least one of the one or more processors via at least one of the one or more memories, to convert, by an audio-tokenization module, the source audio, the received audio, and the templated text sentence into a plurality of source audio tokens, received audio tokens, and text tokens.

10. The computer system of claim 9, further comprising:
    program instructions, stored on at least one of the one or more storage media for execution by at least one of the one or more processors via at least one of the one or more memories, to create an input sequence comprising a first separator token, the source audio tokens, a second separator token, a third separator token, the received audio tokens, a fourth separator token, a fifth separator token, the text tokens, and a sixth separator token; and program instructions, stored on at least one of the one or more storage media for execution by at least one of the one or more processors via at least one of the one or more memories, to provide the input sequence to the generative model as input.

11. The computer system of claim 9, wherein the audio-tokenization module comprises a per-chunk image-based tokenizer using a VQ-VAE model.

12. The computer system of claim 8, further comprising program instructions, stored on at least one of the one or more storage media for execution by at least one of the one or more processors via at least one of the one or more memories, to dynamically update the circle to graphically represent the voice propagation distance of the source audio in real time as the user is speaking.

13. The computer system of claim 8, wherein the voice propagation distance is multiplied by a preset scaling factor.

14. The computer system of claim 8, wherein the generative model is trained through autoregressive language modeling.

15. A computer program product comprising:
one or more computer-readable storage media;
program instructions, stored on at least one of the one or more storage media, to receive, at a microphone, a source audio;
program instructions, stored on at least one of the one or more storage media, to create a zero-decibel received audio with a same duration as the source audio;
program instructions, stored on at least one of the one or more storage media, to calculate, by a generative model, a voice propagation distance of a user based on the source audio, the received audio, and a templated text sentence describing a category of a mixed reality environment experienced by the user;
program instructions, stored on at least one of the one or more storage media, to draw a virtual circle within the mixed reality environment centered on a user avatar representing the user and with a radius equal to the voice propagation distance; and
program instructions, stored on at least one of the one or more storage media, to transmit the source audio to one or more participants within the mixed-reality environment represented by one or more participant avatars located within the virtual circle.

16. The computer program product of claim 15, wherein the program instructions, stored on at least one of the one or more storage media, convert, by an audio-tokenization module, the source audio, the received audio, and the templated text sentence into a plurality of source audio tokens, received audio tokens, and text tokens.

17. The computer program product of claim 16, further comprising program instructions, stored on at least one of the one or more storage media, to create an input sequence comprising a first separator token, the source audio tokens, a second separator token, a third separator token, the received audio tokens, a fourth separator token, a fifth separator token, the text tokens, and a sixth separator token; and program instructions, stored on at least one of the one or more storage media, to provide the input sequence to the generative model as input.

18. The computer program product of claim 16, wherein the audio-tokenization module comprises a per-chunk image-based tokenizer using a VQ-VAE model.

19. The computer program product of claim 15, further comprising program instructions, stored on at least one of the one or more storage media, to dynamically update the circle to graphically represent the voice propagation distance of the source audio in real time as the user is speaking.

20. The computer program product of claim 15, wherein the voice propagation distance is multiplied by a preset scaling factor.

* * * * *